US009887776B2

(12) United States Patent
Lv et al.

(10) Patent No.: US 9,887,776 B2
(45) Date of Patent: Feb. 6, 2018

(54) LIGHT DIMMING METHOD AND DEVICE FOR ALLEVIATING INTER-FRAME FLICKER

(71) Applicant: ZTE Corporation, Shenzhen (CN)

(72) Inventors: Ning Lv, Shenzhen (CN); Zhou Zhi, Shenzhen (CN); Zhong Yu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 15/110,220

(22) PCT Filed: Jun. 30, 2014

(86) PCT No.: PCT/CN2014/081268
§ 371 (c)(1),
(2) Date: Jul. 7, 2016

(87) PCT Pub. No.: WO2015/103855
PCT Pub. Date: Jul. 16, 2015

(65) Prior Publication Data
US 2016/0329963 A1    Nov. 10, 2016

(30) Foreign Application Priority Data

Jan. 7, 2014   (CN) .......................... 2014 1 0005913

(51) Int. Cl.
*H04B 10/00*    (2013.01)
*H04B 10/116*   (2013.01)
(Continued)

(52) U.S. Cl.
CPC ............ *H04B 10/116* (2013.01); *G06F 3/002* (2013.01); *H04B 10/1141* (2013.01); *H04B 10/54* (2013.01); *H04B 10/66* (2013.01)

(58) Field of Classification Search
CPC .. H04B 10/116; H04B 10/66; H04B 10/1141; H04B 10/54; G06F 3/002; H05B 27/02
(Continued)

(56) References Cited

U.S. PATENT DOCUMENTS 8,093,817 B2 * 1/2012 Frumau ............. H05B 37/0272
250/227.21
8,107,825 B2 * 1/2012 Rajagopal ............ H04B 10/116
398/172
(Continued)

FOREIGN PATENT DOCUMENTS

CN    102412953 A    4/2012
CN    102461017 A    5/2012
(Continued)

OTHER PUBLICATIONS

International Search Report dated Oct. 10, 2014 re: Application No. PCT/CN2014/081268; pp. 1-4, citing: CN 102612810 A, CN 102461017 A, US 2011064405, CN 102498681 A, CN 102412953 A and US 2013004182 A1.

(Continued)

*Primary Examiner* — Ken N Vanderpuye
*Assistant Examiner* — Abbas H Alagheband
(74) *Attorney, Agent, or Firm* — Cantor Colburn LLP

(57) ABSTRACT

Provided are a light dimming method for alleviating inter-frame flicker and dimming device. The light dimming method includes that: an average luminance value $Avg_{data}$ when a sender sends physical frames is calculated; whether inter-frame flicker is generated when the sender sends data or not is judged according to a ratio of $Avg_{data}$ to an average luminance value $Avg_{light}$ in an illumination state; and if the inter-frame flicker is generated when the sender sends the data, the sender inserts a dimming frame in an idle pattern, wherein the dimming frame is used for compensating for a (Continued)

luminance difference between $Avg_{data}$ and $Avg_{light}$. A value of a duty cycle of the physical frame sent to regulate the luminance of the light source in the idle pattern of the sender is within a certain range, and is not required to be accurately equal to a duty cycle of a line coding method adopted for a physical layer.

7 Claims, 2 Drawing Sheets

(51) Int. Cl.
*H04B 10/66* (2013.01)
*H04B 10/114* (2013.01)
*G06F 3/00* (2006.01)
*H04B 10/54* (2013.01)

(58) Field of Classification Search
USPC .......................................... 398/118, 116, 172
See application file for complete search history.

(56) References Cited

U.S. PATENT DOCUMENTS

| | | | | |
|---|---|---|---|---|
| 8,521,035 B2* | 8/2013 | Knapp | H04L 12/43 | 315/158 |
| 8,620,154 B2* | 12/2013 | Li | H04W 76/028 | 398/1 |
| 8,666,259 B2* | 3/2014 | Lim | H04B 10/116 | 398/140 |
| 8,731,406 B2* | 5/2014 | Rajagopal | H04B 10/116 | 345/691 |
| 8,774,142 B2* | 7/2014 | Rajagopal | H04B 10/114 | 370/277 |
| 8,855,496 B2* | 10/2014 | Rajagopal | H04B 10/1149 | 398/128 |
| 8,873,965 B2* | 10/2014 | Giustiniano | H04B 10/116 | 398/118 |
| 9,467,232 B2* | 10/2016 | Walewski | H03M 7/16 | |
| 2004/0036799 A1* | 2/2004 | Weitbruch | G09G 3/2029 | 348/400.1 |
| 2004/0161246 A1* | 8/2004 | Matsushita | G06F 3/002 | 398/187 |
| 2004/0201561 A1* | 10/2004 | Funamoto | G09G 3/3611 | 345/89 |
| 2007/0024571 A1* | 2/2007 | Maniam | H04B 10/1141 | 345/102 |
| 2007/0210725 A1* | 9/2007 | Marosek | H05B 33/0815 | 315/291 |
| 2008/0203928 A1* | 8/2008 | Frumau | H05B 37/029 | 315/151 |
| 2010/0002018 A1* | 1/2010 | Hirata | G09G 5/028 | 345/690 |
| 2010/0284690 A1* | 11/2010 | Rajagopal | H04B 10/116 | 398/43 |
| 2011/0026917 A1* | 2/2011 | Li | H04W 76/028 | 398/1 |
| 2011/0064405 A1* | 3/2011 | Rajagopal | H04B 10/114 | 398/43 |
| 2011/0064416 A1* | 3/2011 | Rajagopal | H04B 10/116 | 398/130 |
| 2011/0150285 A1* | 6/2011 | Kimura | G01S 5/16 | 382/103 |
| 2011/0164881 A1* | 7/2011 | Rajagopal | H04B 10/116 | 398/128 |
| 2012/0001567 A1* | 1/2012 | Knapp | H04L 12/282 | 315/291 |
| 2012/0002974 A1* | 1/2012 | Schenk | H04B 10/1149 | 398/130 |
| 2012/0087676 A1* | 4/2012 | Lim | H04B 10/116 | 398/182 |
| 2012/0093517 A1* | 4/2012 | Rajagopal | H04B 10/116 | 398/130 |
| 2013/0004182 A1* | 1/2013 | Kim | H04B 10/116 | 398/118 |
| 2013/0266325 A1* | 10/2013 | Giustiniano | H04B 10/116 | 398/130 |
| 2014/0105607 A1* | 4/2014 | Castor | H04B 10/1149 | 398/118 |
| 2014/0306609 A1* | 10/2014 | Kang | H05B 33/086 | 315/117 |
| 2015/0115833 A1* | 4/2015 | Kwon | H05B 33/086 | 315/294 |
| 2017/0149500 A1* | 5/2017 | Aoyama | H04B 10/116 | |

FOREIGN PATENT DOCUMENTS

| | | | |
|---|---|---|---|
| CN | 102498681 A | 6/2012 | |
| CN | 102612810 A | 7/2012 | |

OTHER PUBLICATIONS

Written Opinion dated Oct. 10, 2014 re: Application No. PCT/CN2014/081268, pp. 1-9, citing: CN 102612810 A.
Supplemental European Search Report dated Oct. 27, 2016 re: Application No. PCT/CN2014/081268; pp. 1-8; citing: US 2011/064416 A1 and US 2007/0210725 A1.

* cited by examiner

LIGHT DIMMING METHOD AND DEVICE FOR ALLEVIATING INTER-FRAME FLICKER

TECHNICAL FIELD

The present disclosure relates to a Visible Light Communication (VLC) technology, and in particular to a light dimming method and device for alleviating inter-frame flicker.

BACKGROUND

A VLC technology refers to a technology for short-distance light wireless communication with an optical medium which is visible for human eyes and has a wavelength ranged from 400 nm to 700 nm. The VLC technology has the advantages of being resistance to electromagnetic interference, having no interference related to a Radio Frequency (RF) system, and being capable of adopting an unlicensed spectrum. When visible light is adopted for data transmission, a visible light source (such as a light-emitting diode) may be rapidly turned on and turned off or luminance of the visible light source may be modulated at a sender; and at a receiver, a modulated light signal is converted into data which may be processed by the receiver after being received.

When visible light is adopted for communication, it is necessary to ensure that there is no influence on normal use of a user over illumination equipment at the same time of implementing data transmission. Thus, the following two problems are required to be considered: the first is to realize a data transmission function; and the second is to avoid the problem of inter-frame flicker during transmission of a data frame. The problem of inter-frame flicker is caused by a difference between average luminance of a light source during data sending and average luminance in an illumination state (that is, a sender is in a receiving state or an idle illumination state).

According to a method for alleviating inter-frame flicker in a related technology, a sender in an idle/receiving state adopts an idle pattern, namely independently sending a frame used for regulating luminance of a light source. Such a method has a requirement on accurate calculation for making a duty cycle of the frame used for regulating the luminance of the light source the same as a duty cycle of a line coding scheme adopted by a physical layer. Therefore, average luminance values of the frame used for regulating the luminance of the light source and a data frame are equal.

SUMMARY

The embodiments of the present disclosure provide a light dimming method and device for alleviating inter-frame flicker, so as to extend a luminance range of a compensatory frame used for dimming.

In order to solve the technical problem, an embodiment of the present disclosure discloses a light dimming method for alleviating inter-frame flicker, which may include that:

an average luminance value $Avg_{data}$ when a sender sends physical frames is calculated;

whether inter-frame flicker is generated when the sender sends data or not is judged according to a ratio of $Avg_{data}$ to an average luminance value $Avg_{light}$ in an illumination state; and if the inter-frame flicker is generated when the sender sends the data, the sender inserts a dimming frame in an idle pattern, wherein the dimming frame is used for compensating for a luminance difference between $Avg_{data}$ and $Avg_{light}$.

Optionally, in the method, the step that whether inter-frame flicker is generated when the sender sends the data or not is judged according to the ratio of $Avg_{data}$ to $Avg_{light}$ may include that:

whether the following formula is true or not is judged according to $Avg_{data}$ and $Avg_{light}$:

$$\frac{|Avg_{data} - Avg_{light}|}{Avg_{light}} \leq K,$$

where K is a constant; and when the formula is not true, it is determined that the inter-frame flicker is generated when the sender sends the data.

Optionally, in the method, the step that the sender inserts the dimming frame in the idle pattern may include that:

a duty cycle range of a dimming frame to be inserted is calculated according to the following formula:

$$(1-K) \times A \leq \alpha \leq (K+1) \times A,$$

where A represents a duty cycle of a line coding method adopted for a physical layer, and K is a constant; and the sender inserts and sends a dimming frame adopting any duty cycle within the calculated duty cycle range in the idle pattern.

Optionally, in the method, the step that the average luminance value $Avg_{data}$ when the sender sends the physical frame is calculated may include that:

the sender calculates the duty cycle of the line coding method adopted for the physical layer to obtain $Avg_{data}$.

Another embodiment of the present disclosure further discloses a light dimming device for alleviating inter-frame flicker, which may include:

a storage component, configured to store dimming information, with different lengths, used for regulating luminance of a light source; and a processing component, configured to calculate an average luminance value $Avg_{data}$ when a sender sends physical frames, judge whether inter-frame flicker is generated when the sender sends data or not according to a ratio of $Avg_{data}$ to an average luminance value $Avg_{light}$ in an illumination state, and if the inter-frame flicker is generated when the sender sends the data, extract corresponding dimming information from the storage component to generate a dimming frame and insert the dimming frame into a physical frame in an idle pattern of the sender, wherein the dimming frame is used for compensating for a luminance difference between $Avg_{data}$ and $Avg_{light}$.

Optionally, in the device, the processing component may be configured to judge whether the following formula is true or not according to $Avg_{data}$ and $Avg_{light}$:

$$\frac{|Avg_{data} - Avg_{light}|}{Avg_{light}} \leq K,$$

where K is a constant; and when the formula is not true, determine that the inter-frame flicker is generated when the sender sends the data.

Optionally, in the device, the processing component may be configured to calculate, according to the following formula, a duty cycle range of a dimming frame to be inserted:

$$(1-K) \times A \leq \alpha \leq (K+1) \times A,$$

where A represents a duty cycle of a line coding method adopted for a physical layer, and K is a constant; and the processing component may be configured to extract dimming information consistent with the duty cycle range from the storage component, generate the dimming frame and insert and send the dimming frame in the idle pattern of the sender.

Optionally, in the device, the processing component may be configured to calculate the duty cycle of the line coding method adopted for the physical layer to obtain $Avg_{data}$.

Optionally, the device may be arranged in the sender of a VLC system, or may be arranged outside the sender of the VLC system.

According to the technical solutions of the embodiments of the present disclosure, a value of a duty cycle of the physical frame sent to regulate the luminance of the light source in the idle pattern of the sender is within a certain range, and is not required to be accurately equal to the duty cycle of the line coding method adopted for the physical layer.

DETAILED DESCRIPTION OF THE EMBODIMENTS

Figure 1:
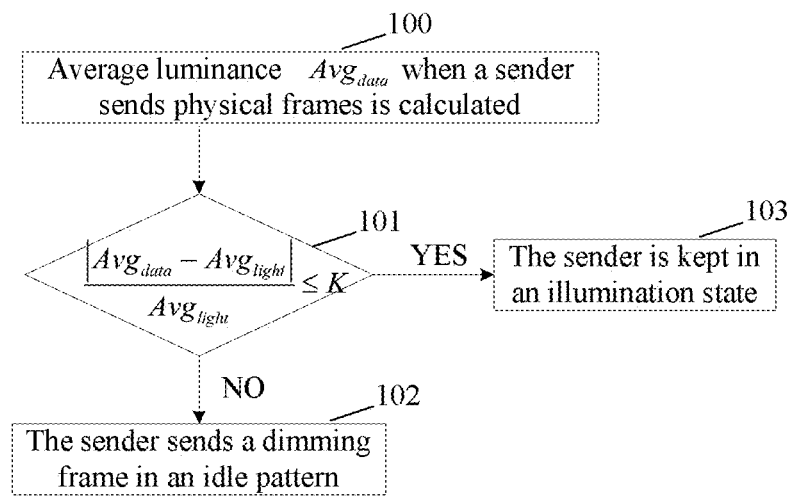
FIG. 1 is a flowchart of a method for alleviating inter-frame flicker according to an embodiment of the present disclosure.

In order to make a purpose, technical solutions and advantages of the present disclosure clearer, the technical solutions of the present disclosure will be further described below with reference to the drawings in detail. It is important to note that embodiments of the present disclosure and characteristics in the embodiments may be freely combined under the condition of no conflicts.

Embodiment 1

The embodiment of the present disclosure provides a method for alleviating inter-frame flicker based on a light source luminance change that human eyes can perceive, that is, a duty cycle of a physical frame sent to regulate luminance of a light source in an idle pattern of a sender is within a certain range, and is not required to be accurately equal to a duty cycle of a line coding method adopted for a physical layer.

A light dimming method for alleviating inter-frame flicker provided by the embodiment includes that:

an average luminance value $Avg_{data}$ when a sender sends physical frames is calculated;

whether inter-frame flicker is generated when the sender sends data or not is judged according to a ratio of $Avg_{data}$ to an average luminance value $Avg_{light}$ in an illumination state; and if the inter-frame flicker is generated when the sender sends the data, the sender inserts a dimming frame in an idle pattern, wherein the dimming frame is used for compensating for a luminance difference between $Avg_{data}$ and $Avg_{light}$.

In an exemplary embodiment, when calculating the average luminance value $Avg_{data}$ when the sender sends the physical frame, $Avg_{data}$ may be obtained by calculating a duty cycle of a line coding method adopted for a physical layer.

When the average luminance value $Avg_{data}$ when the physical frame is sent is compared with the average luminance value $Avg_{light}$ in the illumination state, the ratio of $Avg_{data}$ to $Avg_{light}$ may be calculated according to the following formula:

$$\frac{|Avg_{data} - Avg_{light}|}{Avg_{light}} \leq K.$$

The formula is obtained according to the Weber-Fechner theorem, and it defines a luminance change that human eyes can feel. Parameter K in the formula is obtained by experiments.

When inter-frame flicker that human eyes can feel is generated when the data is sent, the sender sends the dimming frame used for alleviating flicker in the idle pattern. The idle pattern refers to that the sender is in a receiving state or an idle illumination state.

In the embodiment, average luminance calculation of the inserted dimming frame in the idle pattern is determined by duty cycle calculation of the dimming frame, and a duty cycle $\alpha$ of the dimming frame is calculated as follows:

$$\frac{|A - \alpha|}{A} \leq K.$$

In the formula, parameter A represents the duty cycle of a line coding method adopted for the physical layer, and parameter K is a constant, and may be obtained by experiments. The value of the duty cycle calculated by the formula is within a certain range. That is, average luminance of the dimming frame is within a certain range. A dimming frame with any average luminance value in the range does not cause any luminance change that human eyes can perceive when achieving the purpose of dimming.

A specific implementation process of the light dimming method for alleviating inter-frame flicker will be described below with reference to FIG. 1, and includes the following operation.

Step 100: average luminance $Avg_{data}$ when a sender sends physical frames is calculated.

In the step, the average luminance may be determined by a duty cycle of line coding adopted when the sender sends the physical frame. For example, a coding duty cycle of a Manchester code is 50%. When a Manchester code is adopted for line coding of a physical layer, if luminance of bits "0" is 0 and luminance of bits "1" is 100%, for "0" and "1" sequences (i.e. physical frames) with any length, average luminance of the physical frames is 50%. When the sender is in an illumination state, the average luminance is 100%.

Step 101: whether inter-frame flicker currently occurs or not is judged according to a ratio of the average luminance $Avg_{data}$ when the sender sends the physical frame to average luminance $Avg_{light}$ in the illumination state, Step 102 is executed if YES, otherwise the sender is kept in the illumination state 103.

Specifically, whether the ratio of $Avg_{data}$ to $Avg_{light}$ meets the following formula 1 or not is judged in the step:

$$\frac{|Avg_{data} - Avg_{light}|}{Avg_{light}} \leq K. \quad \text{(Formula 1)}$$

The formula is obtained according to the Weber-Fechner theorem, and it defines a luminance change that human eyes can feel. Parameter K in the formula is obtained by experiments.

When the formula is true, it is indicated that inter-frame flicker that human eyes can perceive does not occur when the sender is alternately in a data sending process and the illumination state, that is, inter-frame flicker does not exist, and at this moment, no dimming frame is required to be inserted.

When the formula is not true, it is indicated that inter-frame flicker occurs when the sender is alternately in the data sending process and the illumination state, and Step 102 is required to be executed for dimming frame insertion operation.

Step 102: the sender sends a dimming frame used for alleviating inter-frame flicker in an idle pattern (i.e. a receiving state or the illumination state).

In this step, a duty cycle of the dimming frame used for alleviating inter-frame flicker may be calculated according to the following formula 2:

$$\frac{|A - \alpha|}{A} \leq K. \quad \text{(Formula 2)}$$

In Formula 2, parameter A represents the duty cycle of a line coding method adopted for the physical layer;
parameter $\alpha$ is the duty cycle of the dimming frame; and
parameter K is a constant, and is obtained by experiments.

A value range of the duty cycle $\alpha$ of the dimming frame may further be deduced from Formula 2, as shown in Formula 3:

$$(1-K) \times A \leq \alpha \leq (K+1) \times A \quad \text{(Formula 3)}.$$

Figure 2:
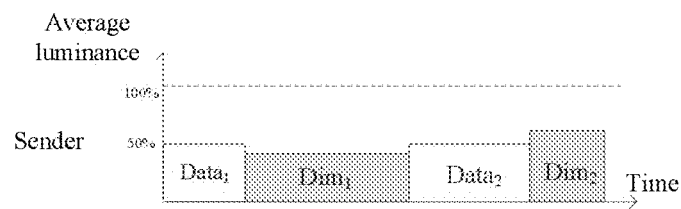
FIG. 2 is a diagram of a method for alleviating inter-frame flicker according to an embodiment of the present disclosure.

The diagram of the dimming frame calculated by Formula 3 is shown in FIG. 2.

In FIG. 2, when data is sent, average luminance of $Data_1$ and $Data_2$ is 50%, and a Manchester code and the like are adopted for line coding. If the sender is in the illumination state during time after $Data_1$ is sent and before $Data_2$ is sent, an average luminance value is 100%. If a luminance change at this moment may be perceived by human eyes (that is, K=0.5), the dimming frame is required to be inserted, such as $Dim_1$ and $Dim_2$ in the figure. Duty cycle values of $Dim_1$ and $Dim_2$ are calculated by Formula 2, and may be any values in a range shown in Formula 2.

The dimming frame sent in the idle pattern is only configured to support visibility of the sender, so that processes of line coding, channel coding, modulation and the like may not be required to be executed on the dimming frame sent by the sender, and "0" and "1"-bit sequences of which duty cycles are consistent with Formula 2 may be directly sent to achieve the purpose of alleviating flicker.

Embodiment 2

The embodiment provides a light dimming device for alleviating inter-frame flicker, which at least includes the following parts:

a storage component, configured to store dimming information, with different lengths, used for regulating luminance of a light source; and a processing component, configured to calculate an average luminance value $Avg_{data}$ when a sender sends physical frames, judge whether inter-frame flicker is generated when the sender sends data or not according to a ratio of $Avg_{data}$ to an average luminance value $Avg_{light}$ in an illumination state, and if the inter-frame flicker is generated when the sender sends the data, extract corresponding dimming information from the storage component to generate a dimming frame and insert the dimming frame into a physical frame in an idle pattern of the sender, wherein the dimming frame is used for compensating for a luminance difference between $Avg_{data}$ and $Avg_{light}$.

In an exemplary embodiment, the processing component is configured to judge whether the following formula is true or not according to $Avg_{data}$ and $Avg_{light}$:

$$\frac{|Avg_{data} - Avg_{light}|}{Avg_{light}} \leq K,$$

where K is a constant; and when the formula is not true, the processing component may determine that the inter-frame flicker is generated when the sender sends the data.

The step that the processing component extracts corresponding dimming information from the storage component to generate the dimming frame is implemented as follows:

a duty cycle range of a dimming frame to be inserted is calculated according to the following formula at first:

$$(1-K) \times A \leq \alpha \leq (K+1) \times A,$$

where A represents a duty cycle of a line coding method adopted for a physical layer, and K is a constant; and the dimming information within the duty cycle range is extracted from the storage component to generate the dimming frame for insertion and sending.

When calculating the average luminance value $Avg_{data}$ when the sender sends the physical frame, the processing component may obtain $Avg_{data}$ by calculating the duty cycle of the line coding method adopted for the physical layer.

It is also important to note that the device may be arranged in the sender of a VLC system, or may also be independently arranged.

Figure 3:
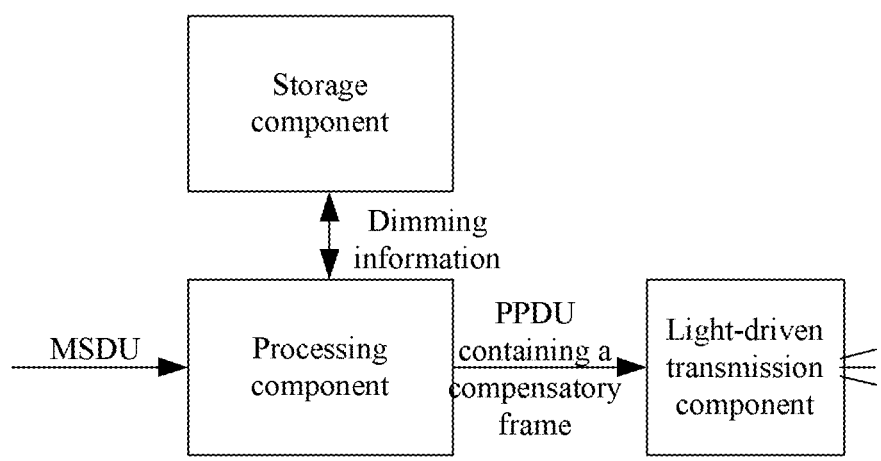
FIG. 3 is a structure diagram of a dimming device according to an embodiment of the present disclosure.

A specific working process of the dimming device will be described below with a dimming device shown in FIG. 3 as an example. As shown in FIG. 3, the dimming device at least includes a processing component, a storage component and a light-driven transmission component, wherein:

the storage component is configured to store dimming information, with different lengths, used for regulating luminance of a light source, including "0" and "1" sequences with different lengths;

the processing component is configured for coding and decoding of a physical frame, generation of a dimming frame and the like, specifically including calculating an average luminance value $Avg_{data}$ when a sender sends the physical frame, judging whether inter-frame flicker is generated when the sender sends data or not according to a ratio of $Avg_{data}$ to an average luminance value $Avg_{light}$ in an illumination state, and if the inter-frame flicker is generated when the sender sends the data, extracting corresponding dimming information from the storage component to generate a dimming frame and insert the dimming frame into a physical frame in an idle pattern; and the light-driven transmission component is configured to implement data transmission, light source luminance regulation and illumination, a method in the related technology may be adopted for specific implementation, and its implementation is not intended to limit the scope of protection of the present disclosure, and will not be elaborated herein.

In this embodiment, the dimming information in the dimming frame is sequences composed of "0" and "1", read from the storage component, with different lengths.

Those skilled in the art should know that all or part of the steps in the method may be implemented by related hardware instructed by a program, and the program may be stored in a computer-readable storage medium, such as a read-only memory, a magnetic disk or a compact disc. Optionally, all or part of the steps of the embodiment may also be implemented by one or more integrated circuits. Correspondingly, each component/element in the embodiment may be implemented in form of hardware, and may also be implemented in form of software function component. The present disclosure is not limited to a combination of hardware and software in any specific form.

The above is only the preferred embodiment of the present disclosure and not intended to limit the scope of protection of the present disclosure. Any modifications, equivalent replacements, improvements and the like made within the principle of the present disclosure shall fall within the scope of protection of the present disclosure.

What is claimed is:

1. A light dimming method for alleviating inter-frame flicker, comprising:
    calculating an average luminance value ($Avg_{data}$) when a sender sends physical frames;
    judging whether inter-frame flicker is generated when the sender sends data or not according to a ratio of $Avg_{data}$ to an average luminance value ($Avg_{light}$) in an illumination state; and
    if the inter-frame flicker is generated when the sender sends the data, inserting, by the sender, a dimming frame in an idle pattern, wherein the dimming frame is used for compensating for a luminance difference between $Avg_{data}$ and $Avg_{light}$;
    wherein judging whether the inter-frame flicker is generated when the sender sends the data according to the ratio of $Avg_{data}$ to $Avg_{light}$ comprises:
    judging whether the following formula is true or not according to $Avg_{data}$ and $Avg_{light}$:

$$\frac{|Avg_{data} - Avg_{light}|}{Avg_{light}} \leq K,$$

where K is a constant; and
    when the formula is not true, determining that the inter-frame flicker is generated when the sender sends the data.

2. The method as claimed in claim 1, wherein inserting, by the sender, the dimming frame in the idle pattern comprises:
    calculating, according to the following formula, a duty cycle range of a dimming frame to be inserted:

$$(1-K) \times A \leq \alpha \leq (K+1) \times A,$$

where A represents a duty cycle of a line coding method adopted for a physical layer, and K is a constant; and
    inserting and sending, by the sender, a dimming frame adopting any duty cycle within the calculated duty cycle range in the idle pattern.

3. The method as claimed in claim 2, wherein calculating the average luminance value $Avg_{data}$ when the sender sends the physical frame comprises:
    calculating, by the sender, the duty cycle of the line coding method adopted for the physical layer to obtain $Avg_{data}$.

4. A light dimming device for alleviating inter-frame flicker, comprising:
    a storage component, configured to store dimming information, with different lengths, used for regulating luminance of a light source; and
    a processing component, configured to calculate an average luminance value ($Avg_{data}$) when a sender sends physical frames, judge whether inter-frame flicker is generated when the sender sends data according to a ratio of $Avg_{data}$ to an average luminance value ($Avg_{light}$) in an illumination state, and if the inter-frame flicker is generated when the sender sends the data, extract corresponding dimming information from the storage component to generate a dimming frame and insert the dimming frame into a physical frame in an idle pattern of the sender, wherein the dimming frame is used for compensating for a luminance difference between $Avg_{data}$ and $Avg_{light}$;
    wherein the processing component is configured to judge whether the following formula is true according to $Avg_{data}$ and $Avg_{light}$:

$$\frac{|Avg_{data} - Avg_{light}|}{Avg_{light}} \leq K,$$

where K is a constant; and
    when the formula is not true, determine that the inter-frame flicker is generated when the sender sends the data.

5. The device as claimed in claim 4, wherein the processing component is configured to calculate, according to the following formula, a duty cycle range of a dimming frame to be inserted:

$$(1-K) \times A \leq \alpha \leq (K+1) \times A,$$

where A represents a duty cycle of a line coding method adopted for a physical layer, and K is a constant; and
    the processing component is configured to extract dimming information consistent with the duty cycle range from the storage component, generate the dimming frame and insert and send the dimming frame in the idle pattern of the sender.

6. The device as claimed in claim 5, wherein the processing component is configured to calculate the duty cycle of the line coding method adopted for the physical layer to obtain $Avg_{data}$.

7. The device as claimed in claim 5, arranged in the sender of a Visible Light Communication (VLC) system, or arranged outside the sender of the VLC system.

* * * * *